United States Patent
Trionfetti

Patent Number: 5,871,314
Date of Patent: Feb. 16, 1999

[54] DEVICE FOR BALANCING ROTORS BY MATERIAL REMOVAL

[75] Inventor: Gianni Trionfetti, Milan, Italy

[73] Assignee: Balance Systems S.r.L., Milan, Italy

[21] Appl. No.: 944,839

[22] Filed: Oct. 6, 1997

[30] Foreign Application Priority Data

Oct. 8, 1996 [IT] Italy .................................. MI96A2080

[51] Int. Cl.$^6$ ...................................................... B23C 1/14
[52] U.S. Cl. .......................... 409/165; 409/162; 409/166; 409/189; 409/191; 73/462
[58] Field of Search ..................................... 409/162, 164, 409/165, 166, 167, 168, 189, 190, 191; 73/462

[56] References Cited

U.S. PATENT DOCUMENTS

| | | | |
|---|---|---|---|
| 3,854,339 | 12/1974 | Muller | 73/462 |
| 4,384,431 | 5/1983 | Jackson | 409/191 |
| 4,467,649 | 8/1984 | Mueller | 73/462 |
| 4,529,342 | 7/1985 | Babel | 409/164 |
| 4,730,961 | 3/1988 | Cassan | 409/166 |
| 5,431,514 | 7/1995 | Saito et al. | 409/165 |
| 5,765,270 | 6/1998 | Schrod et al. | 409/166 |

Primary Examiner—Steven C. Bishop
Assistant Examiner—Adesh Bhargava
Attorney, Agent, or Firm—Browdy and Neimark

[57] ABSTRACT

A device (1) for balancing rotors (3) by material removal is disclosed, which comprises a milling tool (18) provided with a first and a second cutting regions (18a, 18B) disposed transversely of each other, to remove material in the presence of feed movements for cutting, directed both radially of a rotor (3) and tangentially of the outer surface (4) of the rotor (3), and comprising support and relative-movement means (2) for positioning and moving the milling tool (18) and rotor (3) relative to each other, which means engages the rotor (3) in a manner adapted to cause rotation of said rotor about its rotation axis (5) even while the milling tool (18) is removing material from the rotor (3).

10 Claims, 3 Drawing Sheets

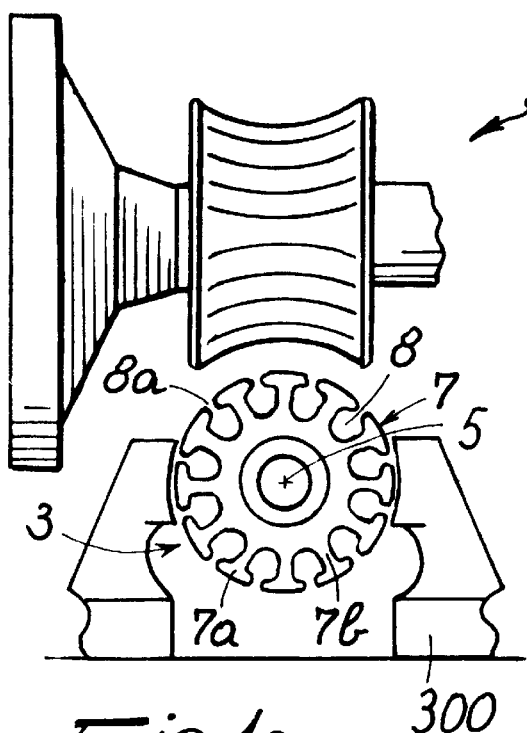
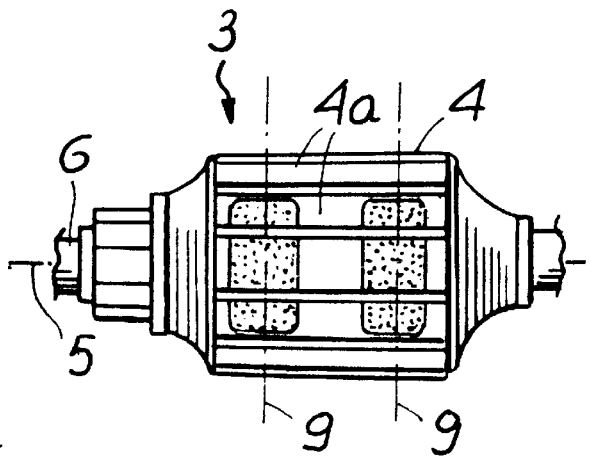
Fig. 1a KNOWN ART
Fig. 1b
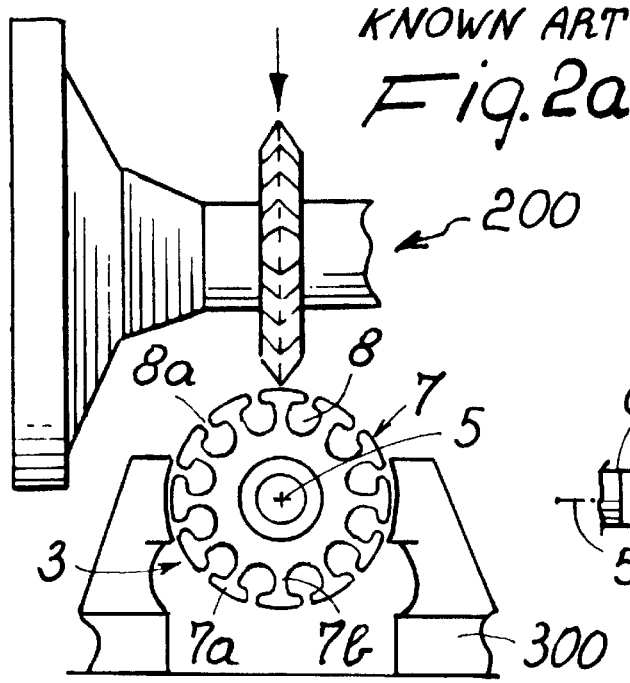
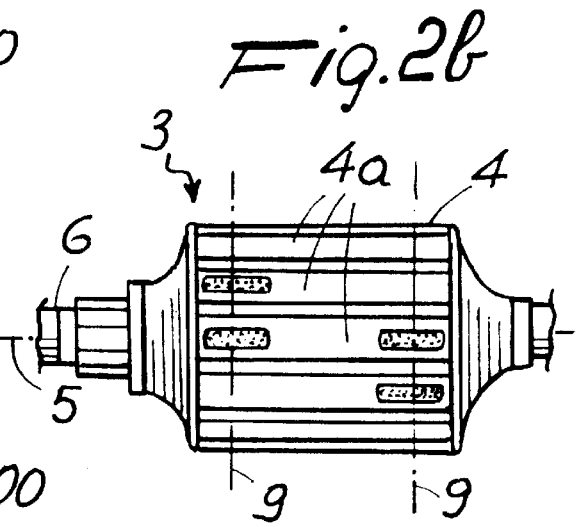
KNOWN ART
Fig. 2a
Fig. 2b

DEVICE FOR BALANCING ROTORS BY MATERIAL REMOVAL

FIELD OF THE INVENTION

The present invention relates to a device for balancing rotors by removing material therefrom, which rotors currently have a rotation axis, a shaft coaxial with the rotation axis and an outer surface, at least partly cylindrical and coaxial with the rotation axis, from which material is removed.

Preferably, the device is employed for balancing rotors of electric motors, having laminar packs or bodies provided with radial pole pieces externally forming portions of a cylindrical surface and altogether creating housings for electric windings.

The device is of the type comprising at least one milling tool, a drive motor controlling the rotation of the milling tool, support and relative-movement means for locating and moving the milling tool and the rotor relative to each other, and electronic drive and control members.

DESCRIPTION OF THE PRIOR ART

Several devices capable of carrying out balancing of rotors, such as rotors or armatures of electric motors for car components, household appliances and electric tooling for example, are presently known.

These known devices act by removing material from the outer rotor surface, at balancing planes perpendicular to the rotation axis of said rotors.

Known devices among other things are also provided with electronic drive and control members including an unbalance-measuring unit supplying data concerning the amount and position of unbalances to be eliminated, for the intended balancing planes. Data is transmitted to a work unit carrying out material removal from the rotor, to appropriate amounts, by milling operations executed at the balancing planes.

Two different operating modes to which different devices correspond, are known for carrying out material removal.

A first operating mode consists in carrying out a wide milling, technically known as pole milling, on each balancing plane by means of a milling cutter rotating about an axis transverse to the rotor axis and having a cutting profile in the form of a concave arc of a circle of a diameter similar to the outer diameter of the rotor to be balanced. The rotor enters the concavity of the rotating milling cutter.

In cutters for pole milling, the arc of a circle of the cutting profile has an extension corresponding to a plurality of said radial pole pieces of the rotors, so as to be able to remove material from a plurality of pole pieces, at a region on either side of each unbalance plane.

Since pole milling encloses all outer points of several radial pole pieces, independently of the local thickness of the latter, it cannot be executed very deeply.

For instance, a maximum material-removal depth included between half a millimeter and one millimeter is typical. Pole milling offers the advantage that a single milling operation is required, but, on the other hand, a different milling cutter is required to be provided for each rotor diameter and consequently production costs are increased when there is a wide variety of rotors to be balanced.

In addition, the concave cutting profile of the milling cutter, above all if said cutter extends over an arc of a circle of an important width, does not possess the same efficiency at each portion thereof because the cutting depth is lower at the end regions of the removed band, relative to the central region of said band.

The second operating mode, known as vectorial milling, uses milling cutters having a V-shaped cutting profile and, in opposition to pole milling, enables material removal from radial pole pieces to be carried out deeply.

For example, cuts of a maximum depth included between one millimeter and two millimeters and a half are possible. However, milling must be executed exactly at the central part of each pole piece, where thickness is appropriate.

It is apparent that the angular position of the unbalance plane is hardly exactly coinciding with the central part of a pole piece. It is therefore necessary to carry out the vector resolution of an unbalance in directions linked to the pitch existing between the pole pieces, so as to execute the milling operations exactly at the central parts of several pole pieces.

As a result, for carrying out milling following the vectorial mode at least two milling operations are almost always required.

Under this situation it is apparent that said two operating modes, i.e. pole mode and vectorial mode, require work units very different from each other.

Equipping work sites so that said sites may have both a work unit for pole-type milling and a work unit for vectorial-type milling to enable the most appropriate procedure to be selected each time or allow use of both operating modes.

In addition, a drawback common both to pole-type milling and vectorial-type milling resides in that they both produce rather important efforts on the laminar rotor packs.

Actually, milling cutters employed in these cases rotate at a speed included, by way of example, between five hundred and two thousand five hundred revolutions per minute and cause an important force on the piece that is to be tightly clamped by a locking clamp.

This force on the piece and locking in a clamp necessarily carried out on the outer cylindrical surfaces of rotors, are not acceptable in rotors of lower mechanical resistance, in motor armatures for cooling of car radiators, for example. Said armatures have a great diameter at the cylindrical surface, relative to the length at the rotation axis.

Therefore, their mechanical consistency is very limited and taking only into account the fact that they are held tight in a clamp, deformations of such an extent are caused that the already measured unbalance is further altered to an important degree.

Finally, both with milling of the pole type and milling of the vectorial type there is some difficulty to operate an efficient second balancing of the rotors when for some reason (tolerance errors in the work units or other intervention errors, for example), the first balancing has not been satisfactory.

In fact, a second milling of the pole type hardly reaches the desired result, if it is developed by widening the milled area towards points that are more and more spaced away from the unbalance points.

A second milling of the vectorial type is greatly critical as regards correct positioning of the milling cutter: if the second cut is not exactly superimposed on the first cut, the cutter does not remove the programmed material alone, but also other material on a side wall of the first hollow.

Thus a working error occurs due to excess removal so that the rotor is to be balanced once again or it must be discarded.

SUMMARY OF THE INVENTION

Under this situation, the technical task underlying the present invention is to conceive a device for balancing rotors by removal of material therefrom, capable of obviating the cited drawbacks and in particular capable of carrying out milling operations of the pole and/or the vectorial type, either depending on an operator's choice or in an automatic manner and by one and the same tool.

The technical task is substantially achieved by a device for balancing rotors by material removal as claimed in claim 1.

BRIEF DESCRIPTION OF THE DRAWINGS

The features and advantages of the invention will be better understood from the detailed description of the device in accordance with the invention, given hereinafter with reference to the accompanying drawings, in which:

FIG. 1a refers to the known art and shows how milling of the pole type is usually carried out on a rotor consisting of an armature of an electric motor;

FIG. 1b is a plan view of the impressions carried out on said armature by the known device shown in FIG. 1a;

FIG. 2a refers to the known art and shows how milling of the vectorial type is usually carried out on a rotor consisting of an armature of an electric motor;

FIG. 2b is a plan view of the impressions carried out on said armature by the known device shown in FIG. 2a;

DESCRIPTION OF THE PREFERRED EMBODIMENT

Figure 3:
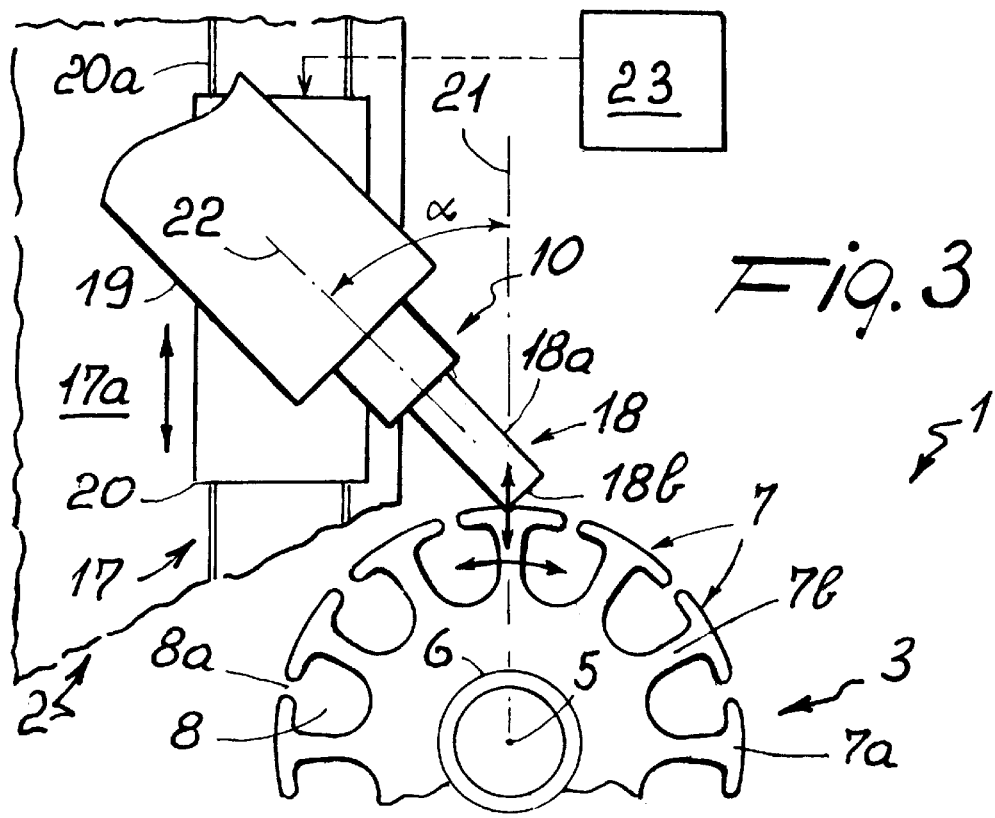
FIG. 3 shows part of the new device in accordance with the invention, shown in elevation at its cutting unit and ready to carry out balancing of a rotor consisting of an armature of an electric motor.

For comparison with the device in accordance with the invention shown in FIGS. 3, 4, 5, FIGS. 1a and 2a show respective work units 100 and 200 of a type already known and described in the introductory part, which are adapted to carry out milling of the pole type and vectorial type, respectively.

Known work units 100 and 200 carry out milling operations or cuts at the balancing planes of a rotor the outer surface of which is held tight by a clamp 300.

In all cases shown in the Figures from 1 to 6, the rotor is denoted by 3 and its outer, mainly cylindrical, surface identified by 4.

Rotor 3 is represented by an armature of an electric motor provided with a rotation axis 5 in coaxial relationship with which a shaft 6 extends and, extending from shaft 6 in a radial direction, there is a laminar pack or body integral with the shaft 6 and provided with radial pole pieces 7 delimiting housings 8 between them, which housings are adapted to receive electric windings.

The radial pole pieces 7 have mushroom-shaped expansions 7a supported by stems 7b and they externally define portions of the outer surface 4 spaced apart from each other by furrows 8a communicating with housings 8 and containing electric windings.

These portions of the cylindrical outer surface 4 practically are longitudinal bands or strips 4a parallel to axis 5.

The balancing planes, identified by 9, are perpendicular to the rotation axis 5 and are spaced apart from each other and located close to the ends of the longitudinal strips 4a.

It is then to point out that removal of material takes place not only at the balancing planes 9, but also in connection with the position of an unbalance plane 9a (FIG. 6) previously identified by known measurement units as mentioned in the introductory part.

Figure 4:
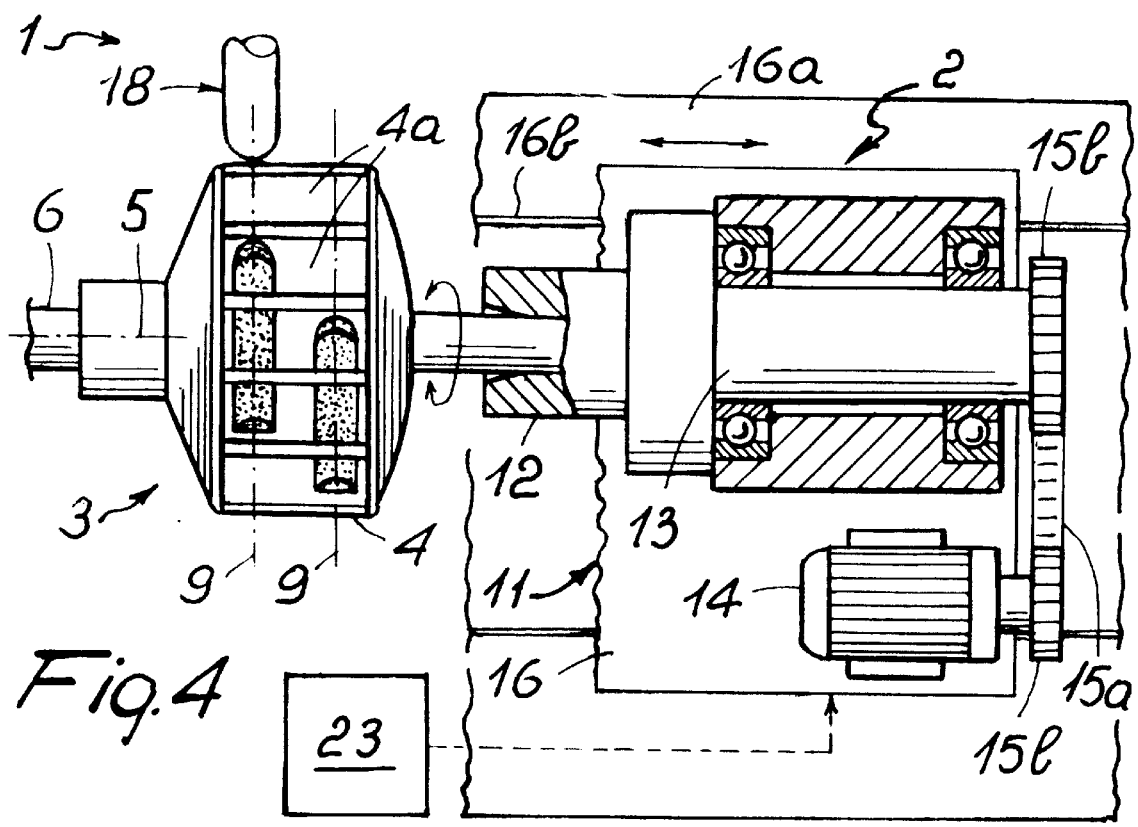
FIG. 4 is a plan view of part of the device of the invention, shown at positioning members for locating an armature and also illustrates how the device carries out milling of a pole type.
Figure 5:
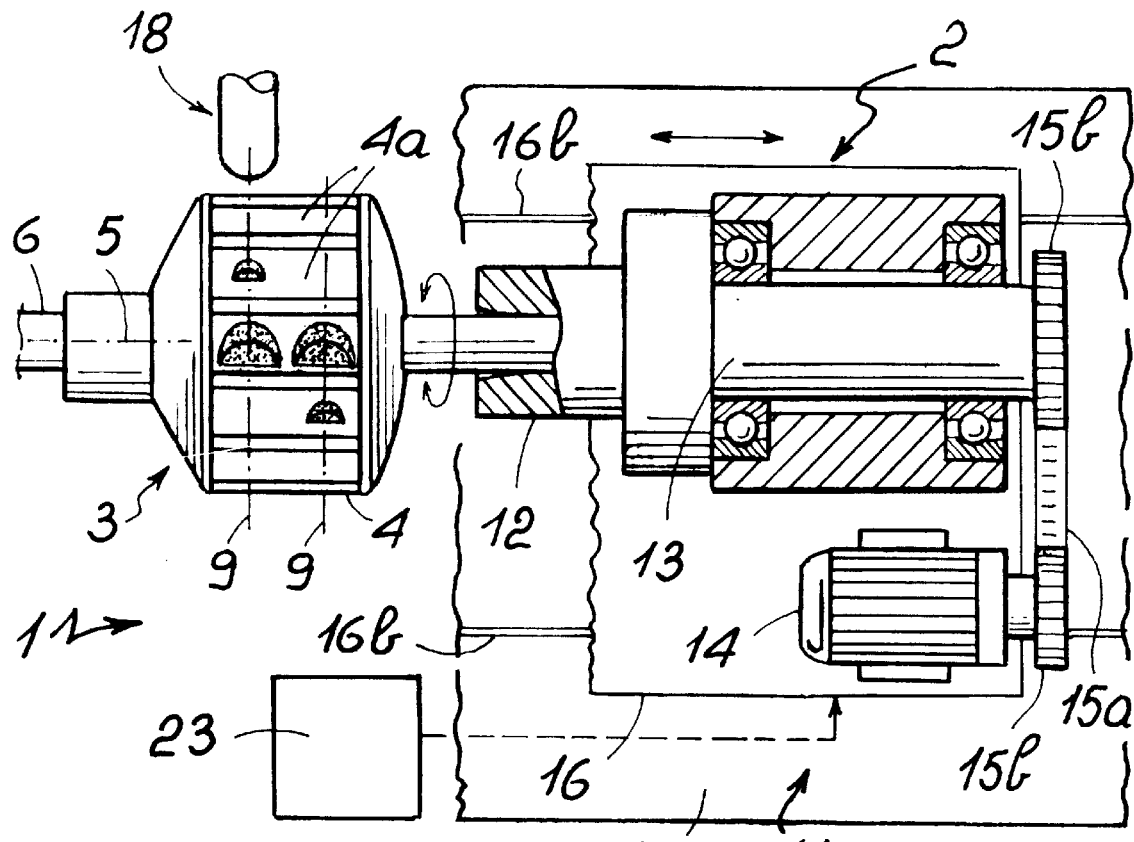
FIG. 5 is similar to FIG. 4, but it shows how the device carries out milling of the vectorial type.

The device in accordance with the invention is denoted by 1 and in FIGS. 3 to 5 is shown active on a particular rotor 3, of the type above detailed, intended for cooling of car radiators, that is having a cylindrical outer surface 4 of a great diameter relative to the rotor or armature 3 length, in a direction parallel to the rotation axis 5.

This great diameter is the cause of a mechanical weakness of the rotor, that must therefore be balanced without any forcing.

Figure 6:
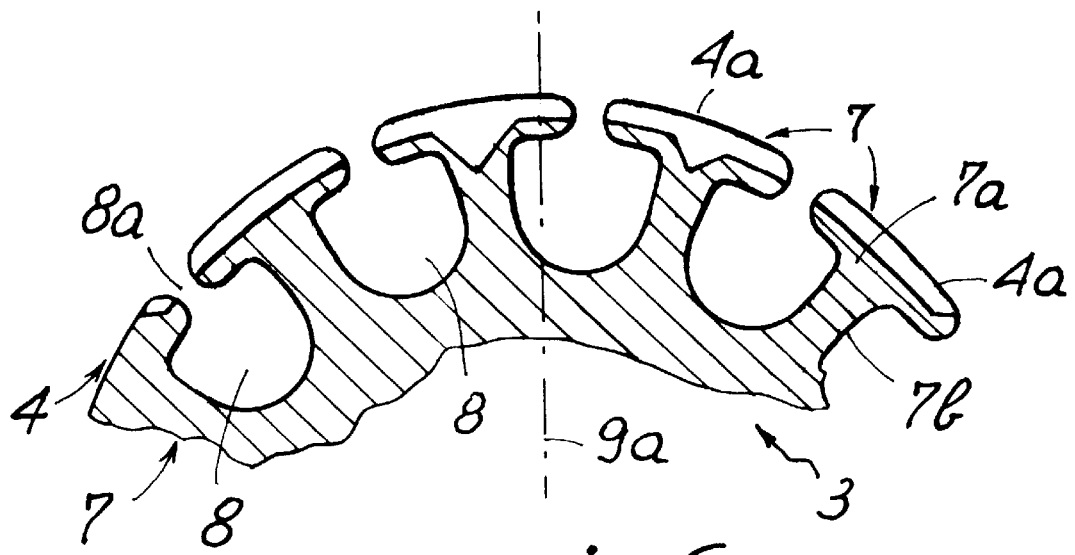
FIG. 6 is a partly sectional view, taken at a balancing plane, of an armature of an electric motor on which both milling operations of the pole type as shown in FIG. 4 and milling operations of the vectorial type as shown in FIG. 5 have been carried out.

Device 1 is intended to be provided with support and relative-movement means 2 adapted to position and move rotor 3 and a cutting unit 10 relative to each other, said cutting unit operating on the rotor to remove material from the longitudinal strips 4a, at the balancing planes 9 and the unbalance plane 9a (FIG. 6).

The support and relative-movement means 2 comprises positioning members active on rotor 3, and approaching members active on the cutting unit 10.

The positioning members, denoted by 11, comprise at least one clamp 12 capable of engaging the rotor 3 at one end of its shaft 6.

Clamp 12, shaped in the form of a chuck, has a front housing to be engaged in a coaxial and fixed manner as regards rotation to one end of shaft 6.

Clamp 12 is then engaged in a coaxial and integral manner as regards rotation to a cylindrical body 13 driven in rotation by a locating motor 14.

Connection between the locating motor 14 and cylindrical body 13 is obtained by a toothed belt 15a and pulleys 15b. The locating motor 14 is of the electric type and adapted to cause clamp 12 to rotate in a precise manner in the two opposite directions.

The positioning members 11 comprise a platform 16 on which at least clamp 12, the cylindrical body 13, the locating motor 14 and elements 15a and 15b are arranged.

Platform 16 is movable on a base 16a in a preferably horizontal direction parallel to shaft 6, to traverse rotor 3 by means of clamp 12.

Two rotating clamps 12 may be provided, but preferably one clamp alone is power driven, to engage both ends of shaft 6. Both clamps can be supported by platform 16. If, on the contrary, only one clamp 12 is provided, the other end of shaft 6 can be possibly rotatably supported by an auxiliary support, known per se and not shown, a fork for example, disposed on the platform 16.

Movement of platform 16 may be guided by first guides 16b integral with the base 16a and parallel to the extension direction of clamp 12, or by another device. In addition, movement can be obtained by an electric motor or fluid-operated drive members.

As pointed out above, the support and relative-movement means 2 also comprises approaching members active on the cutting unit 10 and denoted by 17.

Actually, the cutting unit 10 is movable in a direction radial to rotor 3 by the action of the approaching members 17 engaged with a turret 17a and comprising a slide 20 slidable along vertically-directed guides 20a.

Movement of slide 20 along the second guides 20a can be obtained by an electric or fluid-operated motor supporting the cutting unit 10.

Practically the approaching members 17 are adapted to traverse the cutting unit 10 parallelly to a radial approach plane 21 (FIG. 3) passing through the rotation axis 5 and substantially vertical.

In detail, the cutting unit 10 comprises a milling tool 18 which is driven in rotation by a drive motor consisting of an electric arbor 19.

The milling tool 18 is an "end mill" or a "ball end two-fluted mill", adapted to remove material from radial pole pieces 7 according to at least one first and one second advancing or feed directions for cutting, which are directed tangentially and radially of the outer surface 4, respectively.

Actually, the milling tool 18 has a longitudinal symmetry axis 22 and is provided with a first cutting region 18a extending coaxially with the symmetry axis 22 and a second cutting region 18b consecutive and transverse to the first one and substantially defining an end face of the milling tool 18.

Preferably, the second cutting region 18b extends perpendicularly to the symmetry axis 22.

The milling tool 18 at a work position has its axis 22 disposed obliquely, that is inclined at an angle α preferably of 45 degrees to a radial approach plane 21.

Therefore, the milling tool 18 taken as a whole, in respect of rotor 3 forms an end cutting edge in the form of a vertical V of 45 degrees.

The milling tool 18 obviously can also operate in a third cutting direction, parallel to the rotation axis 5 and longitudinal to strips 4a.

The above takes place when platform 16 causes rotor 3 displacement parallelly to shaft 6, while the same rotor 3 is submitted to the cutting action of the milling tool 18 that in this manner is caused to slide along strips 4a.

In FIG. 5 this third cutting direction is not shown because, due to the reduced length of strips 4a, it is not utilized. In accordance with the invention, it is also provided for the electric arbor 19 to be of a type adapted to cause rotation of the milling tool at high speed, that is at a speed much higher than that usually provided for these balancing operations with material removal.

In fact, while usually traditional mills operate at a speed included between five hundred and two thousand five hundred revolutions per minute (rpm), the electric arbor 19 drives the milling tool 18 in rotation at a speed included between ten thousand and one hundred thousand per minute (rpm). The material-removal effect is also shown in FIG. 6, where a section of a rotor or armature 3 already re-balanced taken along a balancing plane 9 is highlighted.

In particular, FIG. 6 shows an armature 3 on which, in accordance with an aspect of the invention, both a balancing of the pole type and a balancing of the vectorial type combined with each other has been carried out, as better pointed out in the following, with reference to the device operation.

FIGS. 3, 4, 5 diagrammatically show the electronic drive and control members 23 to be made in known manner, active on the support and relative-movement means 2.

Operation of the device is as follows.

In the presence of an unbalanced condition or unbalance, rotor 3 is submitted to the action of the balancing device 1 with material removal at the two balancing planes 9.

If unbalance is substantially normal, the balancing operation can be carried out either in the pole mode (FIG. 4) or in the vectorial mode (FIG. 5), at will.

Practically, the difference consists in how deep the intervention is (because depth can be greater when balancing is carried out in the vectorial mode) and in the type of angular displacement operated by clamp 12, which displacement can be continuous or by steps, each step corresponding to the distance between two contiguous radial pole pieces.

Due to its structure and position, the milling tool 18 is capable of carrying out both types of balancing, i.e. using its V-shaped cutting edge it can operate both by means of its first cutting region 18a forming one side of said edge, and by means of its second cutting region or end region 18b forming the other edge side.

When balancing of the vectorial type is concerned, both cutting regions intervene simultaneously and when balancing of the pole type is concerned, they intervene alternately depending on the rotation direction of rotor 3.

The very high rotation speed of the tool reduces the effort on the strips 4a of rotor 3: the material amount removed at each rotation of the milling tool 18 is minimum and the effort produced by said tool is minimum as well.

The absence of deformations in the rotor is also obtained by engaging the rotor in a clamp 12 or similar device, active at shaft 6.

Clamp 12 can also exert a very strong grip that however does not concern the material removal region and in addition it has the fundamental feature of enabling rotation of rotor 3 even when the milling tool 18 is removing material from its outer surface 4.

If on the contrary unbalance is exceptional and cannot be compensated for by a milling operation either of the pole or of the vectorial type advantageously it is possible to execute both milling operations, which leads to removal of a great amount of material.

In fact, FIG. 6 shows that after carrying out milling of the pole type which is wide but necessarily not very deep, milling of the vectorial type can be added which is less wide but deeper.

In this way all rotors can be balanced and discarded rotors are substantially reduced to zero, even in the presence of very high unbalanced conditions and of mechanically-weak rotors, or in case of rotors that can be easily deformed. The original combination of a pole-mode milling with a vectorial-mode milling can be also used when unbalance is not exceptional, but for any reason a second balancing operation is necessary or appropriate.

In fact, in this case a second milling operation of a different type is advantageous both to make the second intervention more efficient and to avoid positioning of the milling tool to be made too critical when a second intervention similar to the first one is carried out.

Actually, if in a second similar intervention the tool does not take the position of the first intervention in a very precise manner, cutting operations not foreseen or calculated occur and they inhibit an efficient re-balancing of the rotor.

The invention achieves important advantages. In fact, conflicts existing between balancing of the pole type and balancing of the vectorial type have been overcome, so that both balancing operations can be carried out by one and the same device.

In addition, a balancing of the mixed type in which both procedures can be advantageously utilized in several different cases has been made possible.

Then, balancing is carried out by a device that does not at all deform armatures, taking into account both the way in which they are clamped and driven and the operating features of the milling tool.

In addition, the device is of simple application and use because calculation and execution methods typical of milling operations are not substantially modified.

Therefore new training of the employed staff is not required and the complicated calculation programs of pole-mode and vectorial-mode milling operations can be substantially maintained.

What is claimed is:

1. A device for balancing rotors by material removal, said rotors having a rotation axis, a shaft coaxial with said rotation axis and an outer surface, at least partly cylindrical and coaxial with said rotation axis, and said device comprising at least one milling tool, a drive motor controlling the rotation of said milling tool, and support and relative-movement means adapted to position and move said milling tool and rotor with respect to each other, and electronic drive and control members, said milling tool (18) having at least one first and one second cutting region (18a, 18b) disposed transversely of each other, to remove material in the presence of feed movements for cutting, directed both radially of said rotor (3) and tangentially of said outer surface (4), and said support and relative-movement means (2) engaging said rotor (3) in a manner adapted to cause rotation of the rotor about said rotation axis (5) even in the presence of interference of said rotor (3) with said milling tool (18) and actuation of said drive motor (19).

2. The device as claimed in claim 1, wherein said milling tool (18) has a longitudinal symmetry axis (22) and wherein said first cutting area (18a) is coaxial with said symmetry axis (22) and said second cutting area (18b) follows the first one and defines an end face of said milling tool (18).

3. The device as claimed in claim 2, wherein said second cutting area (18b) substantially extends along a plane perpendicular to said symmetry axis (22).

4. The device as claimed in claim 2, wherein said milling tool (18) in a work position is such arranged that said symmetry axis (22) is oblique to a substantially vertical radial plane (21).

5. The device as claimed in claim 4, wherein said milling tool (18) in a work position is such arranged that said symmetry axis (22) is inclined at an angle of substantially forty-five degrees relative to a substantially vertical radial plane (21).

6. The device as claimed in claim 1, wherein said drive motor for said milling tool (18) is an electric arbor (19) adapted to cause rotation of said milling tool (18) at a speed greater than ten thousand rpm.

7. The device as claimed in claim 1, wherein said support and relative-movement means (2) engage said rotor (3) causing rotation thereof at said shaft (6).

8. The device as claimed in claim 1, wherein said support and relative-movement means (2) comprises positioning members (11) at least adapted to cause rotation of said rotor (3) about said rotation axis (5), and approaching members (17) adapted to move said milling tool (18) in a direction radially of said rotor (3).

9. The device as claimed in claim 8, wherein said positioning members (11) comprise at least one rotating clamp (12) adapted to coaxially engage one end of said shaft (6), one locating motor (14) engaging said clamp (12) to cause rotation thereof and adapted to establish the angular position of said clamp (12) and said shaft (6), and one platform (16) movable in a substantially horizontal direction and parallelly to said shaft (6) and supporting said clamp (12) and said locating motor (14), a base (16a) being provided for slidably supporting said platform (16).

10. The device as claimed in claim 8, wherein said approaching members (17) comprise a slide (20) movable in a substantially vertical direction and supporting at least said milling tool (18) and drive motor (19), a turret (17a) being provided for slidably supporting said slide (20).

* * * * *